Patented Aug. 30, 1932

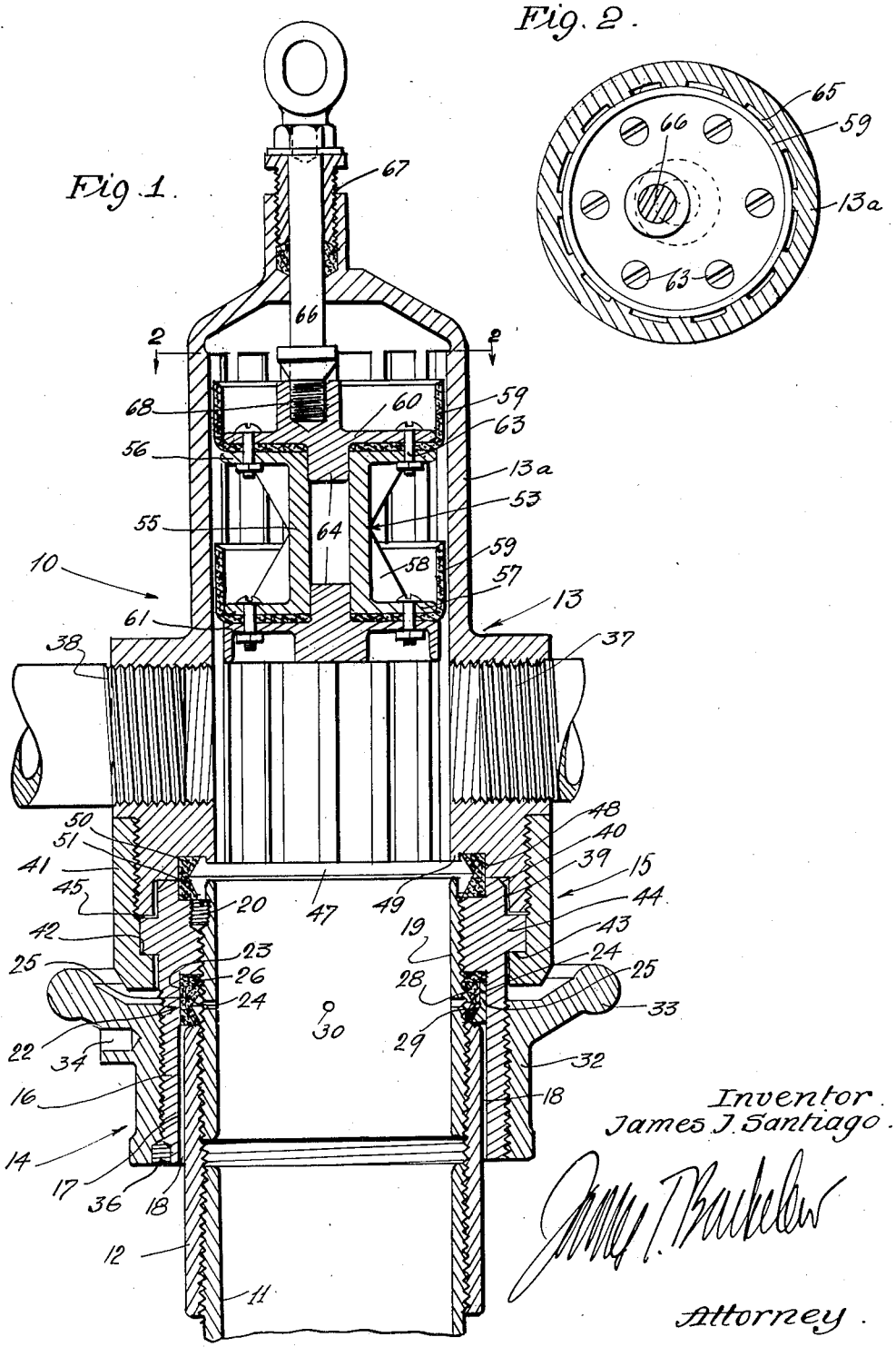

1,875,266

UNITED STATES PATENT OFFICE

JAMES J. SANTIAGO, OF LOS ANGELES, CALIFORNIA, ASSIGNOR TO JOHN GRANT, OF LOS ANGELES, CALIFORNIA

SWIVEL CASING HEAD

Application filed November 21, 1930. Serial No. 497,204.

This invention has reference to circulating or cementing heads for well casing, such devices consisting of a capped body provided with means for attachment to the well casing and a connection with a circulating fluid line, and in the case of cementing heads, also with a connection to a high pressure cement line. The invention may be characterized more specifically as dealing with well heads having screw threaded attachment to the casing or with a pipe coupling on the upper end of the casing.

Casing heads of this general type, that is those which screw on the well pipe, to my knowledge heretofore have been so constructed that in order to screw the head on or off the casing it is necessary to rotate the entire head including that part to which the cement or circulating fluid line connects. Consequently, in order to attach or remove the head from the casing, it heretofore has been necessary to disconnect the circulating fluid line in order that the entire head may be permitted to turn.

It is a primary object of the invention to obviate the necessity for so having to disconnect the circulating fluid line from the head in order to permit its attachment or removal from the casing. This is accomplished, generally speaking, by forming the head with relatively rotatable sections, one of which connects with the circulating fluid line, and the other of which has a threaded part adapted to be screwed onto the well casing. By building the head in this manner, convenience in manipulation is afforded in that the head may be screwed on or off the casing without disturbing its connection with the circulating fluid line. Fluid leakage between the head sections is prevented by suitable packing, preferably of a pressure actuated type that is a packing which becomes increasingly effective in maintaining a fluid tight seal between the parts as the pressure applied to the packing increases. And preferably additional packing will be provided for maintaining a fluid tight seal between the well casing and the section of the head joined thereto.

Additional objects and particularities of construction are contemplated within the scope of the invention, but these, as well as the objects mentioned, will be set forth to best advantage without further preliminary discussion, in the following detailed description. Reference is made throughout the description to the accompanying drawing, illustrating a typical and preferred form of the invention, and in which:

Fig. 1 is a sectional view showing the head attached to the well casing; and

Fig. 2 is a section on line 2—2 of Fig. 1.

Referring to Fig. 1, the head, generally indicated at 10, is shown to be attached to the well pipe or casing 11, and preferably, though not necessarily in certain of the broader aspects of the invention, the head will be attached by threading into the usual pipe coupling 12 on the upper end of the casing. The head 10 may be characterized as comprising upper and lower relatively rotatable sections 13 and 14 interconnected by a swivel joint generally indicated at 15, the upper section 13 comprising essentially a cap, and the lower section being provided with means, hereinafter described for attachment to the well pipe.

For purposes of describing my invention, I have shown it to be embodied in a cementing head, that is one in which the upper or cap section 13 is of such size as to accommodate a plug. In an ordinary circulating head, or one which is not especially adapted for cementing operations involving the use of a plug carried in the head, the construction of the head will be similar to that illustrated except that the cap will serve merely as a closure above the circulating fluid inlet and will not necessarily be of sufficient size to accommodate the plug. It is to be understood that while I have shown for purposes of description, a head of the plug carrying type, the invention is not to be regarded as impliedly limited thereto, since the invention is independent of the particular form of cap used.

The lower section 14 of the head comprises a sleeve or skirt 16 extending around the upper end of the pipe coupling 12, counterbore 17 of the sleeve being of such size as to provide a small clearance at 18 around the coupling. Threaded into the upper end of sleeve 16 is a liner 19, the internal diameter of which is substantially equal to that of the well pipe 11. Liner 19 and sleeve 16 may be regarded as comprising an integral piece, relative turning between these parts being prevented by some suitable means such as key screw 20. Although in some cases, it may be desirable to make provision whereby sleeve 16 may be threadedly attached to the upper end of the well casing 11 proper, instead of to the coupling 12, it is generally preferred in view of the fact that the casing sections usually carry couplings on their upper end, to attach the head to the coupling. For this purpose, liner 19 is exteriorly threaded and is screwed into the coupling as shown, the liner serving in addition to a means for attaching the head to the casing, also to provide within the coupling a smooth internal surface which permits smooth passage of the plug from the head into the well casing.

Fluid leakage between sleeve 16 and the well casing is prevented by means of suitable packing, generally indicated at 22, contained within space 23 between the upper end of the coupling 12 and the end of counterbore 17. The packing at 22 comprises a packing ring 24 of rubber, leather, or other material, backed by a ring 25 which is engaged by the coupling and which bears at its upper end against packing washer 26. Liner 19 will be threaded into the pipe coupling to the point at which ring 25 is brought into such tight engagement with packing washer 26 as to prevent fluid leakage between said ring and the wall of counterbore 17. The lower interior surface of ring 25 is inwardly inclined as indicated, to provide backing for the lower lip portion of the packing ring which overlaps onto the upper end of the pipe coupling. The inner surface of packing 24 is shaped to provide oppositely inclined pressure faces 28 and 29 for the purpose of causing upon the application of fluid pressure to its inner face, the upper lip of the packing to be effectively forced or expelled into fluid tight engagement with packing washer 26, and the lower lip to be similarly forced into fluid tight engagement with the coupling to prevent leakage between the latter and ring 25. In order that the highest available pressure may be so applied to the packing ring, holes 30 are drilled in liner 19 opposite the packing space to permit pressure within the head to be communicated directly to said space. Thus it will be seen that as the pressure within the head increases, the more effective will be the seal maintained by packing ring 24, since increasing pressures applied to faces 28 and 29 serve to force the upper and lower lips of the packing ring into proportionately tighter engagement with packing washer 26 and the upper end of the pipe coupling.

In order to facilitate screwing liner 19 into and out of pipe coupling, a suitable handle or operating attachment is applied to sleeve 16. This is shown typically as comprising a collar 32 threaded on the lower exterior of the sleeve, and having at its upper end an outwardly projecting flange 33 which may be grasped to turn the lower section of the head on the casing. Sockets 34 are also provided in collar 32, and a bar or wrench thrust into the socket may be used for turning the head when a tight joint is to be taken up or broken. Relative turning between sleeve 16 and collar 32 is prevented by means of key screw 36. Thus liner 19, sleeve 16 and collar 32, though formed as separate parts, when assembled comprise essentially a single part.

The upper section 13 of the head consists of an elongated plug containing cap 13a having connections at 37 and 38 with circulating fluid and pressure fluid cement lines. The internal annular shoulder of the cap at the end of counterbore 39 rests on the upper end of sleeve 16, and preferably the latter is beveled as at 40 so as to reduce the area of the bearing surface between the cap and the sleeve so as to minimize the frictional resistance to relative rotation between the parts. Threaded on the lower end of the cap is a sleeve 41 having an interior upwardly facing bearing shoulder 42 adapted to engage an opposing downwardly facing shoulder 43 formed by flange 44 on sleeve 16. A slight clearance will be allowed at 45 between the lower end of the cap and the upper shoulder of flange 44 in order to permit free turning of the sleeve relative to the cap.

Fluid leakage between the swivel sections of the head, or more properly between the cap and sleeve 16, is prevented by means of a pressure actuated packing ring 47 carried within an annular groove 48. Accidental removal of the packing from within the groove is prevented by an overhanging lip 49 on the cap and the upper end of washer 19 which projects above the bottom of the groove. As in the case of the previously described lower packing ring 24, the inner face of ring 47 is shaped to form oppositely inclined pressure faces 50 and 51 so as to provide increased pressure areas. The pressure applied to face 50 causes the upper lip of the packing ring to be expanded into fluid tight engagement with the wall of groove 48 in the cap; pressure applied to face 51 similarly causing the lower lip to be forced into sealing engagement with the wall of the groove within sleeve 16.

I may describe briefly the cementing plug 53 carried within the upper interior of the cap, and also the plug supporting means, although the particular characteristics of these parts comprise, as to their details, no part of the present invention, but rather the subject matter of my copending application on cementing plugs for casing heads, Ser. No. 497,219, filed on even date herewith.

The plug 53 comprises a tubular body 55 having upper and lower end flanges 56 and 57 reenforced by a suitable number of radial webs 58. Cup leathers 59 are clamped between flanges 56 and 57 and circular plates 60 and 61 joined to said flanges by bolts 63. Each of the clamping plates has an integral plug 64 projecting into the ends of the body bore. The internal diameter of the cap preferably will be slightly greater than that of the casing 11, and preferably the maximum diameter of the plug, that is its diameter at the cup leathers, will be slightly less than the internal cap diameter, or at least the plug will fit the cap with sufficient looseness as to enable it to drop by its own weight into the casing when released. The pressure on the upper and lower ends of the plug is equalized by way of grooves 65 extending longitudinally in the wall of the cap to a point above the top of the plug.

The plug is releasably supported by means of a rod 66 extending through the top of the cap at a point offset from the axial center of the latter, fluid leakage around rod 66 being prevented by packing gland 67. The lower end of the plug supporting rod 66 is threaded into a boss 68 formed integrally with the upper clamping plate 60 and also located at a point offset from the axial or radial center of the plug.

The plug is released by screwing rod 66 out of boss 68, the plug being prevented from turning with the rod by virtue of the eccentric connection between the two. That is, should the plug have a tendency to turn with the rod, the former will, by rotating about its offset center of connection with the rod, be brought into engagement with the wall of the cap, so as to prevent its further turning. It will suffice to state, without describing a well cementing operation in detail, that as the plug drops to a point below the inlets 37 and 38, pressure applied to the top of the plug through one of the inlets will cause the plug to be forced down into the casing and to the bottom of the well.

By constructing the head in two relatively rotatable sections in the manner described, it will be seen that the head may be screwed on or off the casing without breaking the connection of the circulating fluid or cement lines with the upper or cap sections of the head, to obvious advantage in the saving of time and labor. Also, by virtue of this construction, the actual operation of attaching or removing the head from the casing is made more simple than were it required to turn or manipulate the entire head, since the operation involves turning only the lower and comparatively small section of the head.

I claim:

1. In a circulating head for well pipe, upper and lower relatively rotatable tubular sections, said lower section extending downwardly around the upper end of the well pipe, means attached to said lower section for attaching the latter to the interior of the pipe, means forming an internal annular bearing shoulder in one of said sections, means forming an external annular bearing shoulder on the other section and engaging the first mentioned shoulder, packing means preventing fluid leakage between said sections, and packing means preventing fluid leakage between said lower section and the outside of the casing.

2. In a circulating head adapted to be attached to a well pipe coupling, upper and lower relatively rotatable tubular sections, said lower section extending downwardly around the upper end of the pipe coupling and having an externally threaded part attached thereto and adapted to be screwed into said coupling, means forming an internal annular bearing shoulder on one of said sections, means forming an external annular bearing shoulder on the other section and engaging the first mentioned shoulder, packing means preventing fluid leakage between said sections, and packing means between said lower section and the pipe coupling.

3. In a circulating head adapted to be attached to a well pipe coupling, upper and lower relatively rotatable sections, said lower section having an outer portion extending downwardly around the upper end of the pipe coupling and an attached inner externally threaded part adapted to be screwed into said well pipe coupling, means forming an internal annular bearing shoulder on one of said sections, means forming an external annular bearing shoulder on the other section and engaging the first mentioned shoulder, packing means preventing fluid leakage between said sections, and packing means preventing fluid leakage between said lower section and the outside of the casing.

4. A circulating head adapted to be attached to a well pipe coupling embodying, upper and lower relatively rotatable sections, said lower section comprising a sleeve extending downwardly around the ouside of said pipe coupling, and an inner tubular liner attached to said sleeve and threaded into said coupling; and packing means preventing fluid leakage between said sections.

5. A circulating head adapted to be attached to a well pipe coupling embodying, upper and lower relatively rotatable sections, said lower section comprising a sleeve extending downwardly around the outside of said pipe coupling, and an inner tubular liner attached to said sleeve and threaded into said coupling; and separate fluid pressure actuated packing means for preventing fluid leakage between said sections, and between the lower section and said coupling.

6. A circulating head adapted to be attached to a well pipe coupling embodying, upper and lower relatively rotatable sections, said lower section comprising a sleeve extending downwardly around the outside of said pipe coupling and an inner tubular liner attached to said sleeve and threaded into said coupling; and a swivel joint between said sections comprising a downwardly facing external shoulder on said lower section, and a sleeve on said upper section extending downwardly around the lower section and having an upwardly facing integral shoulder adapted to engage said downwardly facing shoulder on the lower section.

7. A circulating head adapted to be attached to a well pipe coupling embodying, upper and lower relatively rotatable sections, said lower section comprising a sleeve extending downwardly around the outside of said pipe coupling and an inner tubular liner attached to said sleeve and threaded into said coupling; a swivel joint between said sections comprising a downwardly facing external shoulder on said lower section, and a sleeve on said upper section extending downwardly around the lower section and having an upwardly facing integral shoulder adapted to engage said downwardly facing shoulder on the lower section; packing means at said swivel joint for preventing fluid leakage between said sections, and packing means for preventing fluid leakage between the first mentioned sleeve and said pipe coupling.

8. A circulating head adapted to be attached to a well pipe coupling embodying, upper and lower relatively rotatable sections, said lower section comprising a sleeve extending downwardly around the outside of said pipe coupling and an inner tubular liner attached to said sleeve and threaded into said coupling; packing means preventing fluid leakage between said sections, and packing means between said sleeve and liner and engaging the upper end of said pipe coupling.

9. A circulating head adapted to be attached to a well pipe coupling embodying, upper and lower relatively rotatable sections, said lower section comprising a sleeve extending downwardly around the outside of said pipe coupling, and an inner tubular liner attached to said sleeve and threaded into said coupling; packing means preventing fluid leakage between said sections; and a handle on said sleeve for screwing said lower section on and off the pipe coupling.

10. In a circulating head adapted to be attached to a well pipe comprising, a lower section comprising a sleeve extending downwardly around said coupling, an inner tubular liner attached to said sleeve and threaded into said coupling; an upper section resting on said lower section; and a swivel joint between said sections comprising an outside downwardly facing shoulder on said sleeve, a sleeve integral with said upper section and extending downwardly around the first mentioned sleeve and having an upwardly facing shoulder adapted to engage the downwardly facing shoulder thereon; and packing means between said sections.

11. In a circulating head adapted to be attached to a well pipe coupling, a lower section comprising a sleeve extending downwardly around said coupling, an inner tubular liner attached to said sleeve and threaded into said coupling, there being an annular space between said sleeve and liner above the pipe coupling, packing means within said space and engaging the coupling; an upper section resting on said lower section; a swivel joint between said sections comprising an outside downwardly facing shoulder on said sleeve, a sleeve integral with said upper section and extending downwardly around the first mentioned sleeve and having upwardly facing shoulder adapted to engage the downwardly facing shoulder thereon; and packing means between said sections.

12. In a circulating head adapted to be attached to a well pipe coupling, a lower section comprising a sleeve extending downwardly around said coupling, an inner tubular liner attached to said sleeve and threaded into said coupling, a handle on said sleeve for screwing said lower section on and off the coupling; an upper section resting on said lower section; a swivel joint comprising an outside downwardly facing shoulder on said sleeve, a sleeve integral with said upper section and extending downwardly around the first mentioned sleeve and having an upwardly facing shoulder adapted to engage the downwardly facing shoulder thereon; and pressure actuated packing between said sections, and between said lower sections and the pipe coupling.

In witness that I claim the foregoing I have hereunto subscribed my name this 31 day of October, 1930.

JAMES J. SANTIAGO.